United States Patent

[11] 3,582,681

[72] Inventors Peter Norman
Dartford;
Camilo Manansala Tabalba, Basildon, both of, England
[21] Appl. No. 869,509
[22] Filed Oct. 27, 1969
[45] Patented June 1, 1971
[73] Assignee International Standard Electric Corporation
New York, N.Y.
[32] Priority Oct. 30, 1968
[33] Great Britain
[31] 51485/68

[54] VARIABLE LOSS DEVICE
3 Claims, 2 Drawing Figs.

[52] U.S. Cl. 307/237, 330/29, 330/145
[51] Int. Cl. H03k 5/08
[50] Field of Search 330/29, 145; 333/14; 307/237; 179/170.8, 170.6, 170.2, 16 E, F

[56] References Cited
UNITED STATES PATENTS
3,343,099 9/1967 Paul ............................ 333/14X

*Primary Examiner*—Roy Lake
*Assistant Examiner*—James B. Mullins
*Attorneys*—C. Cornell Remsen, Jr., Walter J. Baum, Percy P. Lantzy, J. Warren Whitesel, Delbert P. Warner and James B. Raden

ABSTRACT: A transistorized AGC device is proposed for telephone subscriber sets using integrated circuit techniques. The variable loss circuit comprises two transistors bridging the transmission path. The magnitude of the impedance of the emitter-base junction is controlled by injecting a current, the magnitude of which can be varied. The control current is provided by a high impedance (constant current) source realized by two further transistors in grounded base configuration. These transistors present a high impedance to the signal currents and avoid interaction between the signal and control currents.

Inventor
P. NORMAN C. M. TABALBA
By D. P. Warner
Attorney

VARIABLE LOSS DEVICE

This invention relates to a device for controlling the loss presented to electrical signals by a transmission circuit.

Devices and circuit arrangements of this type are used for example in automatic gain control, echo suppressor and compandor circuits. In principle the transmission loss of these devices is varied by connecting either in series with or across the transmission path elements the impedance of which can be varied by the application of electrical control signals. Elements suitable for the purpose are for example thermistors, electronic valves or semiconductor devices such as diodes or transistors.

When diodes or transistors are used the problem arises to prevent as far as possible the interaction between the transmitted alternating current signals and the direct current control signals. To achieve this it is known to isolate the variable loss device from the rest of the system by means of blocking capacitors or transformers. These components are rather large in size and their use in equipments using integrated circuit components and miniaturized assemblies is best avoided.

According to the invention there is provided a variable loss device for a transmission circuit carrying balanced to ground electrical signals from a source to a load, the device comprising an impedance path shunted across said circuit and realized by the emitter-base circuits of two transistors having their emitters connected to the respective conductors of the transmission circuit, their collectors joined together and to a terminal of a source of DC power and their base electrodes joined together and taken to a point of first reference potential, the impedance of said path being controlled by injecting into the emitter electrodes of the said two transistors equal control currents from two high impedance current sources comprising two further transistors having their collector electrodes connected to the respective conductors of said transmission circuit, their base electrodes joined together and taken to a point of second reference potential and having their emitter electrodes joined together and taken to one terminal of a source of control potential, the other terminal of the source of control potential being connected to the other terminal of the source of DC power.

Figure 1:
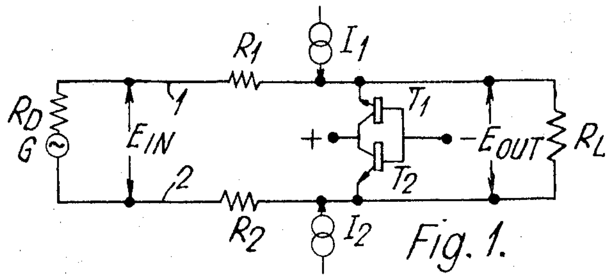
Figure 2:
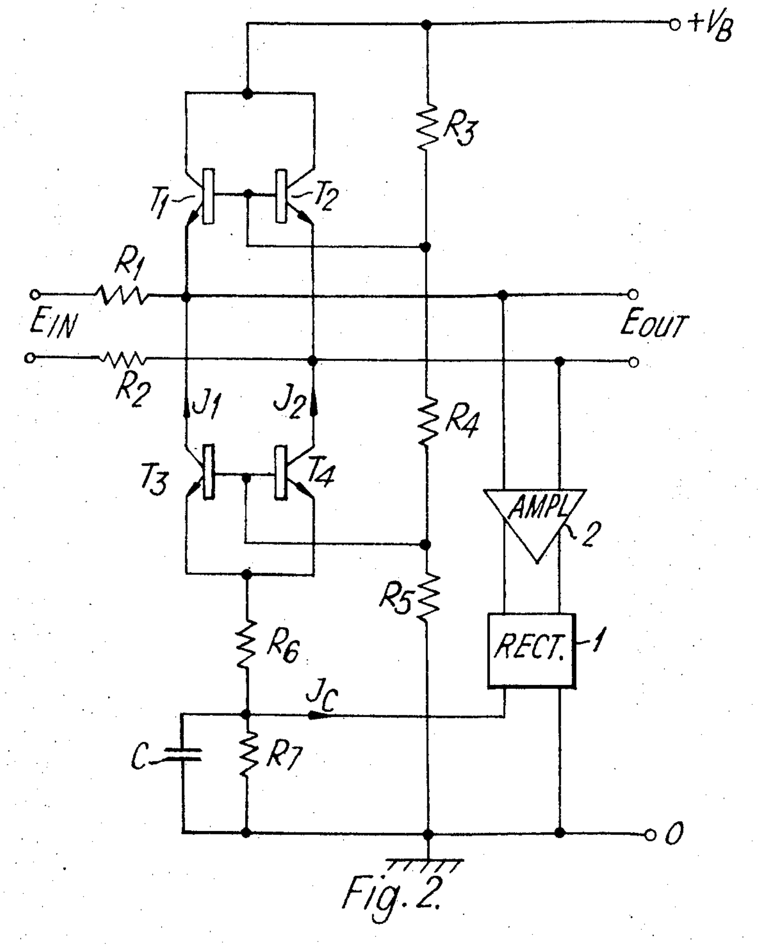

The invention will now be described with reference to the accompanying drawings in which FIG. 1 shows in schematic form the fundamental circuit arrangement according to an embodiment of the invention and FIG. 2 shows in schematic form a preferred embodiment of a variable loss circuit.

In FIG. 1 the variable loss circuit is connected between the source G of alternating current signal and a load impedance $R_L$ and comprises in essence a potential divider having resistors $R_1$ and $R_2$ serially connected between the source and the load and a shunt path formed by the emitter-base circuits of transistors $T_1$ and $T_2$. In cases where the impedance $R_0$ of the source is high the resistors $R_1$ and $R_2$ can be omitted. The impedance of the shunt path is varied by injecting into the emitter electrodes of transistors $T_1$ and $T_2$ equal DC control currents $J_1$ and $J_2$ from two constant current (high impedance) sources.

Since the control currents $J_1$ and $J_2$ are injected at the junction points of three parallel branches containing the source G, the load circuit $R_L$ and the emitter electrodes of the transistors $T_1$ and $T_2$ respectively, only a fraction of these currents, depending on the relative magnitude of the impedances of the paths, will flow into the emitter electrodes. It is therefore of advantage to operate the circuit according to the invention between relatively high impedance circuits. If necessary, transistorized buffer amplifiers presenting high impedances to the variable loss circuit can be inserted between this circuit and the source and load for the alternating current signal.

The impedance presented by the emitter-base path of each of the transistors $T_1$ and $T_2$ is a function of the emitter current $J_E$ and is given by the fundamental transistor equation $$R_{EB}=\frac{1}{J_E}\left(\frac{KT}{q}\right)$$

which at room temperature becomes $$R_{EB}=\frac{26}{J_E}\text{ ohms}$$

when $J_E$ is measured in milliamperes. The loss introduced into the transmission circuit by the transistors $T_1$ and $T_2$ is thus a function of the current injected into the emitter electrodes and can be calculated from the parameters $R_0$, $R_1$, $R_2$ and $R_L$.

The essential feature of the circuit is that the control current for each of the transistors is injected from a source which presents a high impedance to the alternating current signals in order to avoid interaction between the transmitted signals and the control circuits.

A preferred practical realization of the circuit as applied to an automatic gain control circuit is shown in FIG. 2.

Transistors $T_1$ and $T_2$ correspond to those in FIG. 1 and derive their collector power from the source $+V_B$ and bias potential from a potential divider formed by resistors $R_3$ and $R_4$, $R_5$.

The high impedance sources for the control currents are realized by means of transistors $T_3$ and $T_4$ connected as common base DC amplifiers. The emitter-collector circuits of these transistors are connected in series with those of transistors $T_1$ and $T_2$ and the base bias potentials for $T_3$ and $T_4$ are obtained from the junction point of resistors $R_4$ and $R_5$ of the potential divider. The magnitude of the collector currents $J_1$ and $J_2$ is controlled by varying the magnitude of the current $J_C$ injected at the junction of resistors $R_6$ and $R_7$ into the base-emitter circuits of $T_3$ and $T_4$.

In the particular application shown in FIG. 2 the control current $J_c$ is obtained by retifying in rectifier 1 the signals at the output of amplifier 2, whose input is connected across the transmission line. Capacitor C is provided for smoothing the rectified signals. For a given value of circuit impedance as determined by $R_0$, $R_1$ and $R_2$ the total control range of the device is determined by the choice of values of resistors $R_3$ to $R_7$. In this way, by altering the transmission loss of the circuit in dependence of the amplitude of the alternating current signal automatic gain control effect is obtained.

The arrangement of FIG. 2 constitutes an example of a compressor circuit i.e. a circuit in which a given change of amplitude of an input signal $E_{in}$ produces a small change of amplitude of the output signal $E_{out}$. It will be appreciated that the variable loss circuit according to the invention can be modified in a known way to produce the opposite effect i.e. an expandor circuit in which a given change in amplitude of input signal will produce a larger change in amplitude of the output signal.

Transistors of complementary conductivity type can be used in place of the NPN type shown in the figures by reversing the polarity of the source of DC power.

In order not to disturb the balance to ground of the transmission path transistor pairs $T_1$, $T_2$ and $T_3$, $T_4$ should have matched characteristics. A preferred way of realizing this is to use integrated circuit transistor modules.

It is to be understood that the foregoing description of specific examples of this invention is not to be considered as a limitation of its scope.

We claim:

1. A variable loss device for a transmission circuit carrying balanced to ground electrical signals from a source to a load, the device comprising a transmission circuit including two conductors, two transistors providing an impedance path shunted across the transmission circuit, realized by the emmiter-base circuits of the said two transistors, means connecting the emitters of the transistors to the respective conductors of the transmission circuit, means joining together the collectors of the transistors to a source of DC power, means joining the base electrodes of the transistors together and to a first reference potential, the impedance of said path being controlled by injecting into the emitter electrodes of the said two transistors equal control currents from two high impedance current sources including two further transistors having their collector electrodes connected to the respective conductors of said transmission circuit, their base electrodes joined together and to a point of second reference potential and having their emitter electrodes joined together and to one terminal of a source of control potential, the other terminal of the source of control potential being connected to the other terminal of the source of DC power.

2. A device as claimed in claim 1 in which the control potential is derived by tapping, amplifying and rectifying the signals transmitted by the circuit.

3. A device as claimed in claim 2 in which one terminal of the source of control potential is at earth potential.